United States Patent
Hofer et al.

(10) Patent No.: US 10,442,489 B2
(45) Date of Patent: Oct. 15, 2019

(54) HAND PROTECTION DEVICE FOR A VEHICLE

(71) Applicant: Bayerische Motoren Werke Aktiengesellschaft, Munich (DE)

(72) Inventors: Gerhard Hofer, Munich (DE); Helmut Diehl, Kochel (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 128 days.

(21) Appl. No.: 15/663,893

(22) Filed: Jul. 31, 2017

(65) Prior Publication Data

US 2017/0327171 A1 Nov. 16, 2017

Related U.S. Application Data

(63) Continuation of application No. PCT/EP2016/050260, filed on Jan. 8, 2016.

(30) Foreign Application Priority Data

Feb. 6, 2015 (DE) .................. 10 2015 202 096

(51) Int. Cl.
*B62J 17/02* (2006.01)
*B62J 17/00* (2006.01)
(Continued)

(52) U.S. Cl.
CPC .............. *B62J 17/02* (2013.01); *B62J 17/00* (2013.01); *B62J 23/00* (2013.01); *B62J 27/00* (2013.01)

(58) Field of Classification Search
CPC ... B62J 17/02; B62J 17/00; B62J 23/00; B62J 27/00
(Continued)

(56) References Cited

U.S. PATENT DOCUMENTS

2008/0203762 A1 8/2008 Shimanski
2010/0180716 A1* 7/2010 Brumana .................. B62J 23/00
74/551.8
(Continued)

FOREIGN PATENT DOCUMENTS

CN 2302940 Y 1/1999
CN 100999239 A 7/2007
(Continued)

OTHER PUBLICATIONS

German-language Search Report issued in counterpart German Application No. 10 2015 202 096.7 dated Dec. 1, 2015 with partial English translation (10 pages).
(Continued)

*Primary Examiner* — Kevin Hurley
*Assistant Examiner* — Felicia L. Brittman
(74) *Attorney, Agent, or Firm* — Crowell & Moring LLP

(57) ABSTRACT

A hand protection device for a handlebar of a vehicle is provided. The hand protection device includes a protective bracket that can be rigidly connected to the handlebar of the vehicle, and an extension element that is movably arranged relative to the protective bracket. The extension element can be fixed relative to the protective bracket in at least a first position and in a second position which is different from the first position. More than one extension element may be provided, and the extension element second positions may be above or below the handlebar. The vehicle may be a motorbike or a scooter.

17 Claims, 4 Drawing Sheets

(51) Int. Cl.
  *B62J 23/00* (2006.01)
  *B62J 27/00* (2006.01)
(58) Field of Classification Search
  USPC .................................................. 280/304.3
  See application file for complete search history.

(56) References Cited

U.S. PATENT DOCUMENTS

| | | | |
|---|---|---|---|
| 2012/0234129 A1 | 9/2012 | Adan | |
| 2014/0260772 A1* | 9/2014 | Dion .................... | B62K 21/125 74/551.8 |
| 2015/0101441 A1* | 4/2015 | Harada .................. | B62K 21/12 74/489 |
| 2016/0031510 A1* | 2/2016 | Serbinski ................ | B62J 27/00 74/551.8 |

FOREIGN PATENT DOCUMENTS

| | | | |
|---|---|---|---|
| DE | 20 2010 006 315 U1 | 12/2011 | |
| EP | 1 852 341 A2 | 11/2007 | |
| EP | 2 384 960 A1 | 11/2011 | |
| EP | 2384960 A1 * | 11/2011 | ............. B62J 23/00 |
| JP | 49-79936 | 7/1974 | |
| JP | 58-180785 U | 12/1983 | |
| WO | WO 2012/127070 A1 | 9/2012 | |

OTHER PUBLICATIONS

International Search Report (PCT/ISA/210) issued in PCT Application No. PCT/EP2016/050260 dated Mar. 29, 2016 with English translation (7 pages).
German-language Written Opinion (PCT/ISA/237) issued in PCT Application No. PCT/EP2016/050260 dated Mar. 29, 2016 (5 pages).
English translation of Chinese Office Action issued in counterpart Chinese Application No. 201680003052.1 dated Sep. 19, 2018 (seven (7) pages).
English translation of Chinese Office Action issued in counterpart Chinese Application No. 201680003052.1 dated Feb. 19, 2019 (nine (9) pages).

* cited by examiner

HAND PROTECTION DEVICE FOR A VEHICLE

CROSS REFERENCE TO RELATED APPLICATIONS

This application is a continuation of PCT International Application No. PCT/EP2016/050260, filed Jan. 8, 2016, which claims priority under 35 U.S.C. § 119 from German Patent Application No. 10 2015 202 096.7, filed Feb. 6, 2015, the entire disclosures of which are herein expressly incorporated by reference.

BACKGROUND AND SUMMARY OF THE INVENTION

The present invention relates to a hand protection device for a vehicle. The vehicle can be, for example, a single-track vehicle, such as, for example, a motorbike.

Hand protection devices are customarily designed in the form of rigid bars which only carry out the function of hand protection, or as shell elements which serve to increase comfort by increased protection against wind or weather.

European paten document no. EP 1 852 341 A2 describes hand protection for a motorbike, the hand protection having an arm and a shield connected movably to the arm. Damage to the shield in the event of a crash of the motorbike is intended to be prevented by the movable shield.

U.S. patent document no. U.S. 2012/0234129 A1 describes a hand protection device for a motorbike, the hand protection device comprising a main part which is connected rigidly to a handlebar, and an arm part which is connected movably to the main part and to which a shield is fastened. The effect which is intended to be achieved by this is that a rider of the motorbike cannot trap his hands between the handlebar and the shield in the event of a crash.

A disadvantage with the hand protection devices known in the prior art is that they either only carry out a protective function, or else are of very large design because of a comfort function. In addition, it may be that a comfort function with the effect of protection of the rider against wind or weather is desirable only in certain weather and travel conditions which may change, for example, even during a journey.

An object to be achieved at least of some embodiments is to specify a hand protection device for a vehicle, which has both a protective function and a comfort function, wherein at least the comfort function can be variably adjusted by the rider of the vehicle.

The hand protection device described here for a vehicle has a protective bar, according to an embodiment. The protective bar is preferably connectable rigidly to a handlebar of the vehicle. For example, the protective bar can be fixedly connected to the handlebar in such a manner that its orientation with respect to the handlebar cannot be changed or at least not without a tool. The protective bar can either be connectable directly to the handlebar, or else indirectly via further connecting elements, such as connecting rods or the like. The protective bar preferably has a U shape with a first and a second end, wherein the two ends are each directly or indirectly connectable to the handlebar of the vehicle.

Furthermore, an extension element which is arranged movably with respect to the protective bar is provided, which extension element may also be referred to here and below as protective bar extension element, as first extension element or else as first protective bar extension element. The extension element can preferably be fixed at least in a first position and in a second position which is different from the first position. For example, the extension element can be connected in a manner mounted rotatably to the protective bar. The extension element is preferably connected directly to the protective bar at two ends via a respective rotary joint.

According to a further embodiment, the hand protection device has a flow-facing surface. The flow-facing surface of the hand protection device can be understood here as meaning that surface of the hand protection device which is approached by a slipstream which is opposed to the direction of travel of the vehicle, in particular to the forward direction of travel of the vehicle. The flow-facing surface of the hand protection device preferably corresponds in the first position of the extension element to a flow-facing surface of the protective bar. In the second position of the extension element, the flow-facing surface of the hand protection device is preferably enlarged in comparison to the first position.

In the case of the hand protection device described here, the extension element which is arranged movably with respect to the protective bar advantageously makes it possible for aeration of the hands by the slipstream or protection of the hands from the slipstream or rain to be able to be selected by the rider according to requirements.

According to a further embodiment, the extension element can be fixed in at least one further second position. The extension element can particularly preferably be fixed in a multiplicity of further second positions. The protective bar and the extension element are preferably designed here in such a manner that there is no gap between the protective bar and the extension element in its respective position.

For example, the extension element can be fixed by a latching mechanism. Alternatively or additionally, it is also possible for the extension element to be able to be fixed by a stop. The extension element can preferably be brought into the various positions, i.e. from the first position into the at least one second position, without a tool and can be fixed in the respective position without a tool. In other words, a rider of the vehicle does not require any tool in order to bring the extension element from one position into another position and to lock same there.

According to a further embodiment, the extension element can be fixed in a second position above the protective bar and in a further second position below the protective bar. That is to say, the extension element can be fixed in at least two second positions in which the flow-facing surface of the hand protection device is enlarged in comparison to the first position, wherein the extension element protrudes in a second position over the one side of the protective bar and protrudes in the other second position over the other side of the protective bar.

According to a further embodiment, the hand protection device has a second extension element which is arranged movably with respect to the protective bar and can be fixed at least in a first position and in a second position which is different from the first position. The second extension element may also be referred to here and below as second protective bar extension element. The flow-facing surface of the hand protection device preferably corresponds in the first position of the second extension element to a flow-facing surface of the protective bar. By contrast, in the second position of the second extension element, the flow-facing surface of the hand protection device is enlarged in comparison to the first position.

For example, the extension element and the second extension element can each be fixed in a second position, and therefore a flow-facing surface of the hand protection device is formed from a sum of the flow-facing surfaces of the protective bar, the extension element and the second extension element.

It may be possible, for example, that the extension element and the second extension element can each be fixed in a second position, and therefore the extension element and the second extension element protrude on two different sides of the protective bar.

According to a further embodiment, the extension element and the second extension element can each be fixed in a second position, and therefore the extension element and the second extension element protrude on the same side of the protective bar.

Furthermore, the hand protection device described here can have, in addition to the extension element or in addition to the first and second extension elements, one or more further extension elements which can be designed, for example, analogously to the described first or second extension element.

Furthermore, a handlebar for a vehicle is specified. The handlebar is connected to a hand protection device described here. The hand protection device connected to the handlebar can therefore have one or more features of the hand protection device described previously and/or below. The protective bar of the hand protection device is preferably connected rigidly to the handlebar of the vehicle. In particular, the protective bar can be fixedly connected to the handlebar in such a manner that its orientation with respect to the handlebar can either not be changed at all or at least not without a tool. The protective bar can either be connected to the handlebar directly, or else indirectly via further connecting elements, such as connecting rods or the like. The protective bar preferably has a U shape with a first and a second end, wherein the two ends are each connected fixedly directly or indirectly to the handlebar of the vehicle.

Furthermore, a vehicle is specified which has a hand protection device described here. The vehicle can be designed, for example, as a single-track vehicle, in particular as a motorbike, scooter or bicycle. Alternatively, the vehicle can also be designed, for example, as a "quad" or ATV (All Terrain Vehicle). The vehicle preferably has two of the hand protection devices described here, and therefore a rider of the vehicle can protect both hands gripping the handlebar of the vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

In the embodiments and figures, components which are identical or have an identical effect may each be provided with the same reference signs. The elements illustrated and the size ratios thereof with respect to one another should basically not be considered as to scale. On the contrary, individual elements may be illustrated with exaggerated thickness or in a large size for better illustration and/or for better understanding.

Figure 1A:
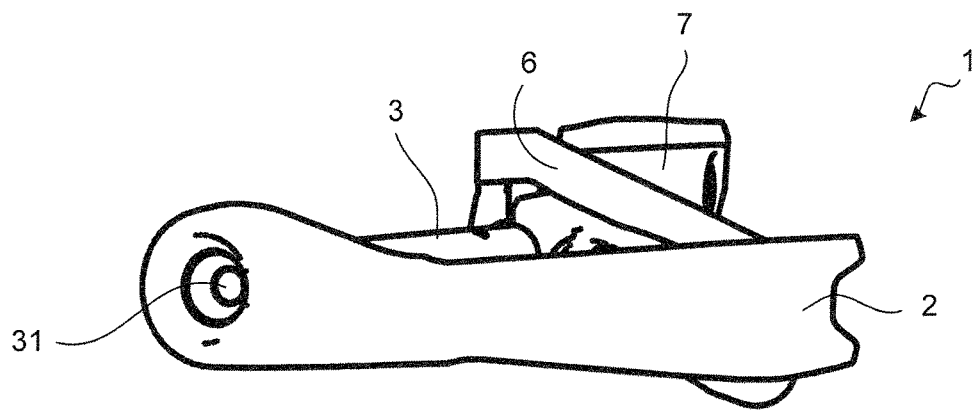
FIGS. 1A and 1B show two views of a hand protection device with a protective bar and an extension element in a first position according to an embodiment of the present invention.
Figure 1B:
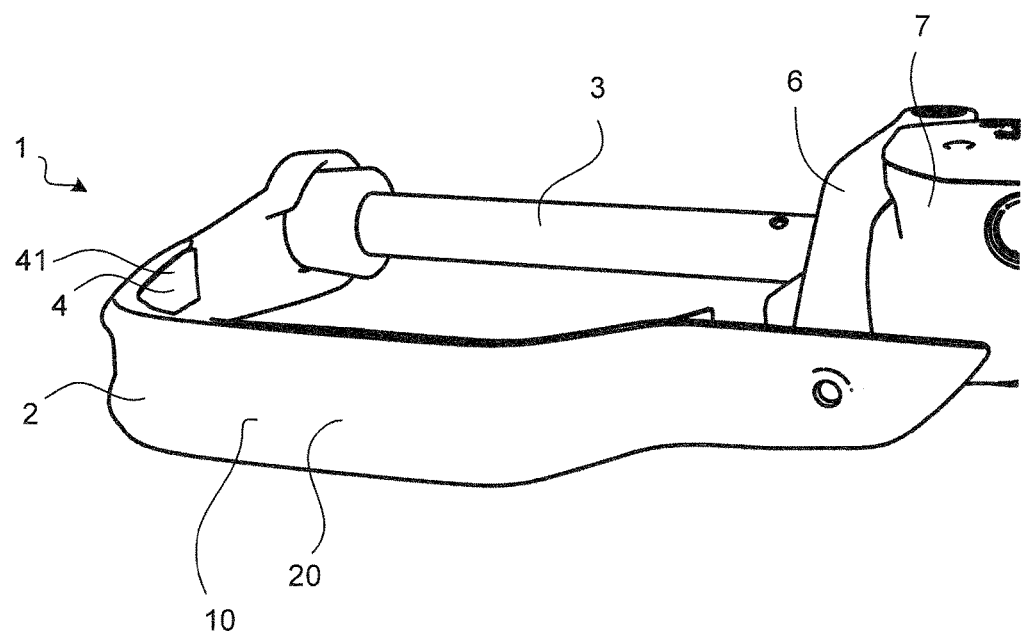

FIGS. 1A and 1B show a hand protection device 1 for a vehicle according to a first embodiment. The hand protection device 1 has a protective bar 2 which is connected rigidly to a handlebar 3 of the vehicle. The protective bar 2 in particular has a first end which is directly connected to the handlebar 3 in the region of a handlebar weight 31 of the handlebar 3. Furthermore, the protective bar 2 has a second end which is connected via a connecting rod 6 to a hand control 7 which is fastened to the handlebar 3. Alternatively, the two ends of the protective bar 2 can also be connected directly to the handlebar 3.

Furthermore, the hand protection device 1 has an extension element 4 which is arranged movably with respect to the protective bar 2. The extension element 4 can be fixed in at least two positions. In FIGS. 1A and 1B, the extension element 4 is fixed in a first position 41 in which the extension element 4 is concealed by the protective bar, in a view from the direction of the approaching slipstream during the travel of the vehicle. The hand protection device 1 has a flow-facing surface 10 which, during the travel of the vehicle, is approached by the slipstream flowing counter thereto and which, in the first position 41 of the extension element 4 that is illustrated in FIGS. 1A and 1B, corresponds to the flow-facing surface 20 of the protective bar 2 since the protective bar 2 conceals the extension element 4 in its first position 41 from the direction of the slipstream.

Figure 2A:
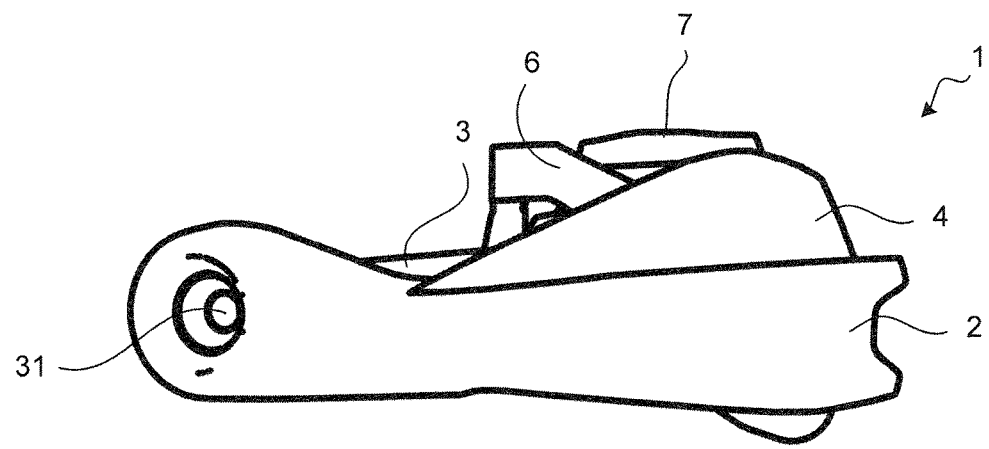
FIGS. 2A and 2B show two views of the hand protection device from FIGS. 1A and 1B with the extension element in a second position.
Figure 2B:
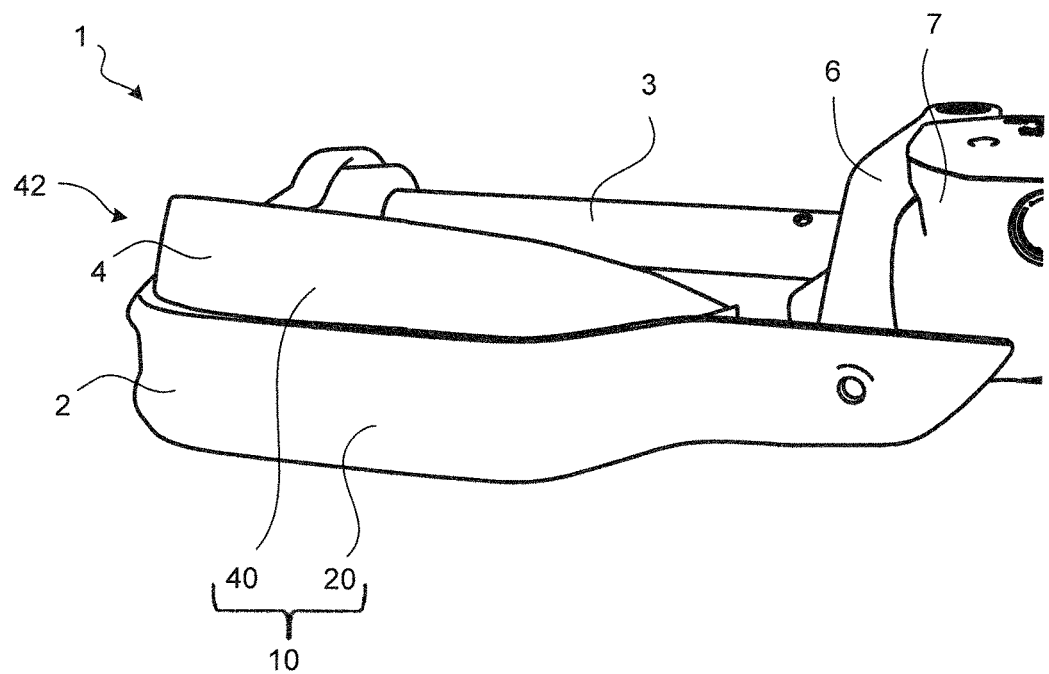

In FIGS. 2A and 2B the extension element 4 is fixed in a second position 42 in which the flow-facing surface 10 of the hand protection device 1 is enlarged in comparison to the first position 41 of the extension element 4 that is shown in FIGS. 1A and 1B. Alternatively to the second position 42 of the extension element 4 that is illustrated in FIGS. 2A and 2B, the extension element 4 can also be fixed in different, further second positions. For example, the extension element 4 can be fixed in different second positions above the protective bar 2 and/or in one or more different second positions below the protective bar 2, wherein, however, in each second position of the extension element 4, the flow-facing surface 10 of the hand protection device 1 is enlarged in comparison to the first position 41 of the extension element 4. As a result, the protective and comfort function of the hand protection device 1 can advantageously be adjusted variably by the rider depending on requirements and, for example, depending on travel and/or weather properties. The protective bar 2 and the extension element 4 are preferably designed in such a manner that, irrespective of which second position of the extension element 4 is selected, there is no gap between the protective bar 2 and the extension element 4.

Figure 3A:
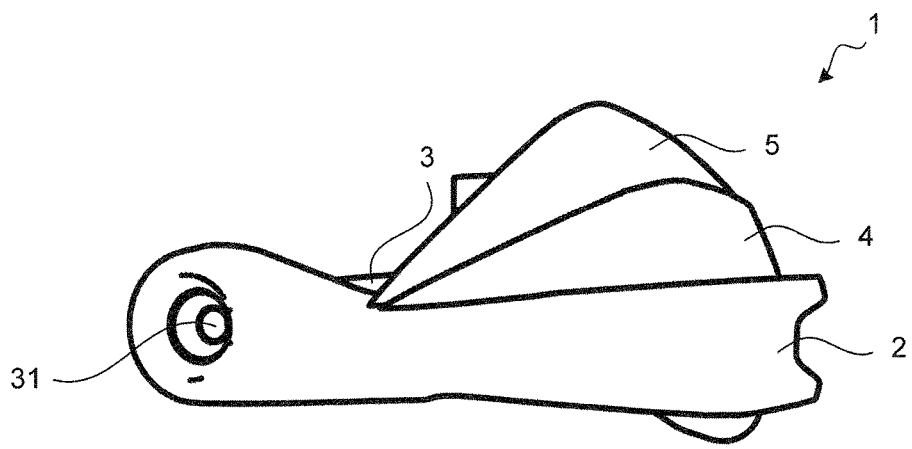
FIGS. 3A and 3B show two views of a hand protection device with a protective bar, a first and a second extension element in a second position according to a further embodiment of the present invention.
Figure 3B:
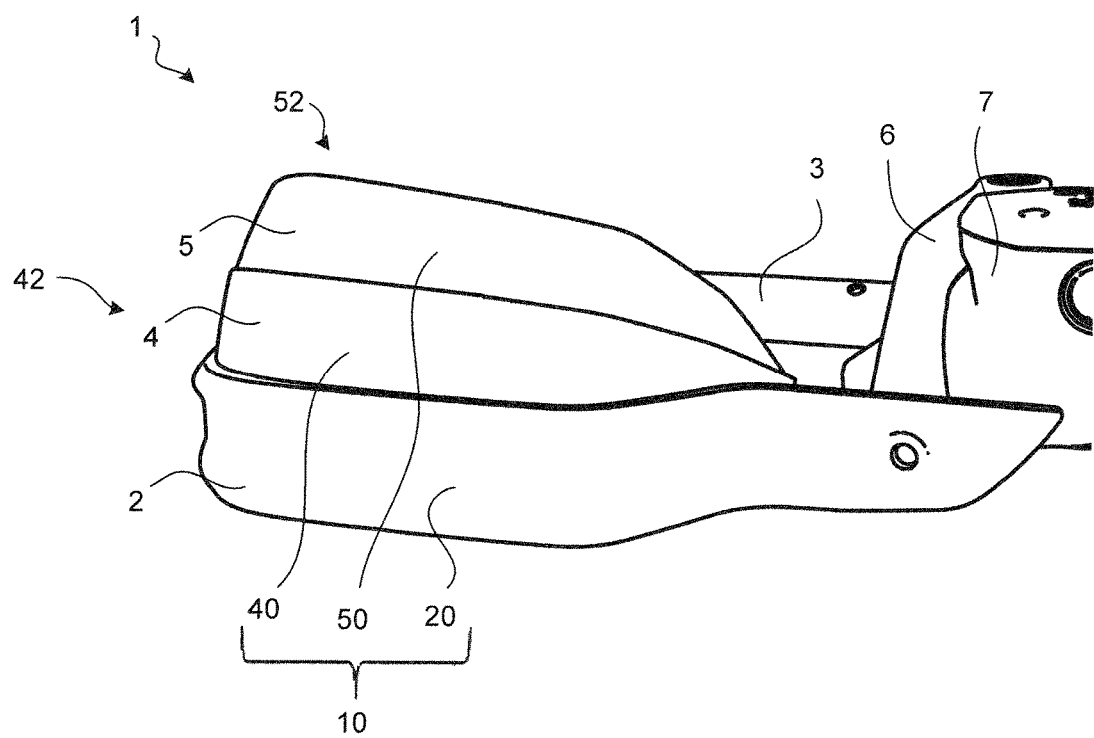

In the case of the hand protection device 1 according to the embodiment according to FIGS. 3A and 3B, the hand protection device 1 furthermore has a second extension element 5 which, like the first extension element 4, is also arranged movably with respect to the protective bar 2. In addition, the second extension element 5 can likewise be fixed in a first position and in at least one second position 52 which is different from the first position. In FIGS. 3A and 3B, the second extension element 5 is fixed in a second position 52 in which the entire flow-facing surface 10 of the hand protection device 1 is enlarged by the opened-out first and second extension elements 4, 5.

Figure 4A:
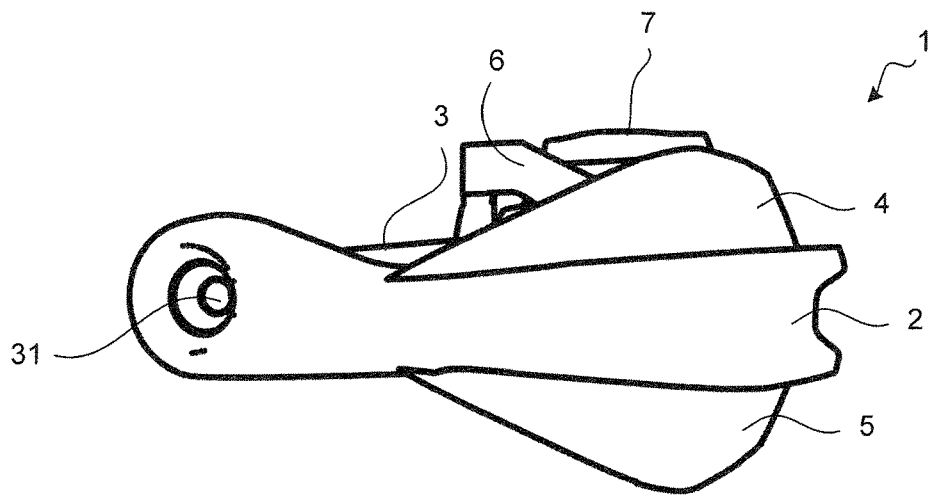
FIGS. 4A and 4B show two views of the hand protection device from FIGS. 3A and 3B with the second extension element in a further second position.
Figure 4B:
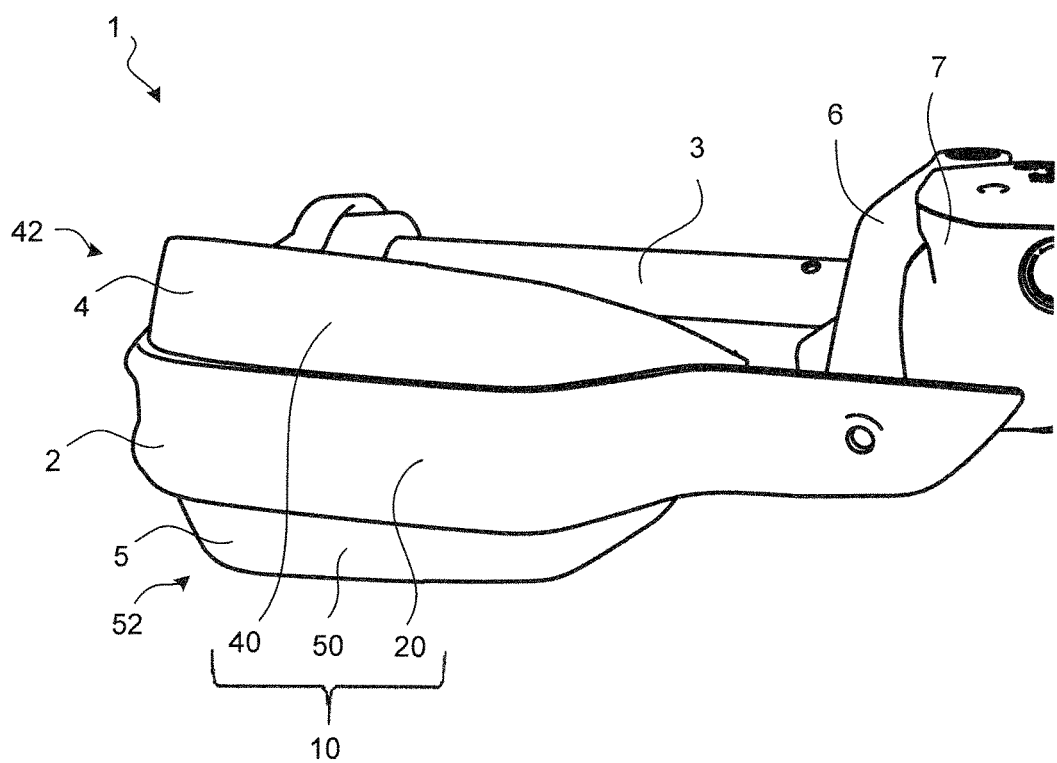

FIGS. 4A and 4B show the hand protection device 1 from FIGS. 3A and 3B according to a further variant in which the second extension element 5 is fixed in a further second position 52. The different positions of the first and/or second extension element 4, 5 can preferably be set by the rider of the vehicle without a tool.

The features described in the exemplary embodiments shown can also be combined with one another according to further exemplary embodiments. Alternatively or additionally, the exemplary embodiments shown in the figures can have further features according to the embodiments of the general description.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

1 Hand protection device
10 Flow-facing surface of the hand protection device
2 Protective bar
20 Flow-facing surface of the protective bar
3 Handlebar
31 Handlebar weight
4 Extension element
40 Flow-facing surface of the extension element
41 First position of the extension element
42 Second position of the extension element
5 Second extension element
51 Flow-facing surface of the second extension element
52 Second position of the second extension element
6 Connecting rod
7 Hand control

What is claimed is:

1. A hand protection device for a vehicle, comprising:
a protective bar configured to be rigidly connected to a handlebar of the vehicle; and
an extension element selectively movable with respect to the protective bar between a first position and at least one second position,
wherein the at least one second position includes two different second positions.

2. The hand protection device as claimed in claim 1, wherein
the extension element is rotatably mounted with the protective bar.

3. The hand protection device as claimed in claim 2, wherein
the hand protection device has a flow-facing surface,
in the first position of the extension element the flow-facing surface of the hand protection device corresponds to a flow-facing surface of the protective bar, and
the flow-facing surface of the hand protection device is enlarged when the extension element is in the at least one second position.

4. The hand protection device as claimed in claim 1, wherein
the extension element is fixable in at least one of the at least one second positions by at least one of a latch and a stop.

5. The hand protection device as claimed in claim 4, wherein
one of the two different second positions is a second position above the protective bar and the other of the two different second positions is below the protective bar.

6. The hand protection device as claimed in claim 1, further comprising:
a second extension element movable with respect to the protective bar between a second extension first position and at least one second extension second position.

7. The hand protection device as claimed in claim 6, wherein
the flow-facing surface of the hand protection device is enlarged when the second extension element is in the second extension second position.

8. The hand protection device as claimed in claim 7, wherein
the extension element and the second extension element each are fixable in their respective second positions to form the flow-facing surface of the hand protection device as a sum of the flow-facing surfaces of the protective bar, the extension element and the second extension element.

9. The hand protection device as claimed in claim 8, wherein
the second position of the extension element and the second extension second position are on two different sides of the protective bar.

10. The hand protection device as claimed in claim 8, wherein
the second position of the extension element and the second extension second position are on one side of the protective bar.

11. The hand protection device as claimed in claim 8, further comprising:
at least one further extension element.

12. The hand protection device as claimed in claim 8, wherein the hand protection device is configured to allow the extension element and the second extension element to be moved between respective first and second positions without use of a tool.

13. The hand protection device as claimed in claim 1, wherein the hand protection device is configured to allow the extension element to be moved between the first and second positions without use of a tool.

14. A handlebar for a vehicle with a hand protection device, comprising:
a handlebar handgrip; and
a hand protection device configured to be rigidly connected to the handlebar of the vehicle at the handgrip, the hand protection device including a protective bar and an extension element selectively movable with respect to the protective bar between a first position and at least one second position,
wherein the at least one second position includes two different second positions.

15. A vehicle, comprising:
a handlebar; and
a hand protection device configured to be rigidly connected to the handlebar of the vehicle, the hand protection device including a protective bar and an extension element selectively movable with respect to the protective bar between a first position and at least one second position, wherein the at least one second position includes two different second positions.

16. The vehicle as claimed in claim 15, wherein the vehicle is a motorbike or scooter.

17. A hand protection device for a vehicle, comprising:

a protective bar configured to be rigidly connected to a handlebar of the vehicle;

an extension element selectively movable with respect to the protective bar between a first position and at least one second position, and a second extension element selectively movable with respect to the protective bar between a second extension first position and at least one second extension second position, wherein in at least one of the first position and second position of the extension element a flow-facing surface of the second extension element is at least one of above and below the protective bar, and in at least one of the first position and second position of the second extension element a flow-facing surface of the second extension element is at least one of above and below the protective bar.

* * * * *